United States Patent [19]

Imaizumi et al.

[11] Patent Number: 5,007,002

[45] Date of Patent: Apr. 9, 1991

[54] SERIAL OR LINE PRINTER ADAPTED FOR USE WITH PAGE DESCRIBING LANGUAGE

[75] Inventors: Mamoru Imaizumi, Nagoya; Yasutada Aoyama, Ikezawa, both of Japan

[73] Assignee: Brother Kogyo Kabushiki Kaisha, Aichi, Japan

[21] Appl. No.: 547,179

[22] Filed: Jul. 3, 1990

[30] Foreign Application Priority Data

Jul. 11, 1989 [JP] Japan .................................. 1-179799

[51] Int. Cl.$^5$ ............................................. G06K 15/00
[52] U.S. Cl. .................................................... 364/519
[58] Field of Search ................................ 364/518–523, 364/235 MS File, 930 MS File; 346/154; 358/462, 246; 400/65

[56] References Cited

U.S. PATENT DOCUMENTS 4,516,139  5/1985  Takigucki ............................. 346/75
4,682,190  7/1987  Ikeda ................................... 346/154

Primary Examiner—Arthur G. Evans
Attorney, Agent, or Firm—Oliff & Berridge

[57] ABSTRACT

A serial printer with a dot print head which prints print data produced in accordance with a page describing language. In this serial printer, it is judged whether or not character data is included in the print data and, if included, whether or not character data printable by the dot print head in a single scanning stroke exists in the character data previously judged, whereby the character data non-printable in a single scanning stroke of the head is printed similarly to graphic data included in the print data after being converted into image data, and the character data printable in a single scanning stroke of the head is printed independently of graphic data. Consequently, the character data can be printed without displacement of dots according to print ability of the dot print head and excellent print quality of the characters can be obtained.

18 Claims, 3 Drawing Sheets

SERIAL OR LINE PRINTER ADAPTED FOR USE WITH PAGE DESCRIBING LANGUAGE

BACKGROUND OF THE INVENTION

1. Field of the Invention

This invention relates to a non-page type, e.g., a serial or line type printer having a function of receiving and printing print information produced in accordance with a page describing language and transferred thereto from a host computer.

2. Description of the Related Art

Conventionally, a page describing language is contrived in order to raise the degree of freedom of a print format and unify standards of a data transfer sequence between a host computer and a printer in the field of printing wherein a page printer such as a laser printer is used.

In recent years, a page printer having a page describing language built therein has such a construction as shown in FIG. 3. In the construction, reference numeral 10 denotes a host computer, and 11 a page printer unit. The host computer 10 and the page printer unit 11 have data transferring/receiving means therein and are connected to each other.

Meanwhile, the page printer unit 11 is constituted from a page describing language interpreting section 1, a page memory 2, and a print controlling section 12. The host computer 10 transfers copy data produced in accordance with a format of the page describing language to the page printer unit 11 by way of the data transferring means. The transfer data received by the page printer unit 11 are transmitted to the internal page describing language interpreting section 1, in which the page describing language is interpreted and converted into data of a dot image necessary for the final printing, and the data from the page describing language interpreting section 1 are stored into the page memory 2 which has a capacity for one full page. Print information produced in accordance with the page describing language and transferred from the host computer 10 is sequentially converted in accordance with the procedure described above, and at a point of time at which preparation of image data for one page is completed, the data are transferred to the print controlling section 12 so that results of printing can be obtained.

However, in the conventional page printer described above all print data produced in accordance with a page describing language are normally developed finally as image data in which there is no distinction between character data and graphic data. Thus, the following problem arises when a page describing language is used with a non-page type printer, e.g., a serial printer.

Generally, upon printing with a serial type printer, the number of scanning strokes of a print head with respect to a print medium is constant. In particular, since the feeding amount of a print medium for each scanning stroke is constant, when character data are to be printed, codes or font data which can be identified by a print controlling section are transferred from a host computer to a printer and printed in a single scanning stroke, and accordingly, they will not be printed over two scanning lines. However, print data produced in accordance with a page describing language are so high in degree of freedom that character data may not always remain on a predetermined scanning line. Since data are transferred as image data to a printer, character data may be printed in two upper and lower portions over two scanning lines as seen in FIG. 4. Consequently, there is a problem in using a page describing language with a serial printer or line printer in that displacement of dots which relies upon an accuracy of controlled operation to move a print head in a vertical direction (relative to the print medium) may take place and, as for character data, the print quality regarding character data may be deteriorated as compared with a page printer.

SUMMARY OF THE INVENTION

The present invention has been made to solve the problem described above, and it is an object of the present invention to make it possible to print information produced in accordance with a page describing language on a serial or line printer and to provide a serial or line type printer which is raised in degree of freedom in a printing function of the printer and has a function of interpreting and printing a page describing language while maintaining a print quality of character data.

In order to attain the object, according to one aspect of the present invention, a serial printer comprises printing means for interpreting print information produced in accordance with a page describing language, converting the print information into image data and printing the image data, first judging means for judging character data and graphic data from the image data, and second judging means for judging whether or not the character data have such a size that they can be printed in a single scanning stroke, wherein, when character data which can be printed in a single scanning stroke are present in the print information, the paper feeding amount by a paper feeding mechanism and the printing amount by the printing means are adjusted so that the character data may be printed in a single scanning stroke.

When print information produced in accordance with a page describing language is received from a host computer, retrieval of character information is executed together with an operation of converting the print information into image data. Normally, information of a character produced in accordance with a page describing language contains a character size and a coordinate position on a printing space as additional information necessary to print the character. Thus, it is judged whether or not the character information has such a size that it can be printed in a single scanning stroke. The criterion then relies upon a maximum number of dots in a direction perpendicular to the direction of movement of the print head which can be printed in a single scanning stroke by the print head. If character information is present which satisfies the condition, the character information is converted into image data, and the image data and a coordinate position thereof are stored into the storage means. After graphic data in the print data for one page are converted into image data, they are printed, and as for the character data, the paper feeding mechanism is operated in terms of dots while referring to the storage means in which the coordinate data are stored so that the print head may be moved to a position at which the print head can print in a single scanning stroke so as to effect printing.

According to the present invention of such construction as described above, there are effects that it is made possible to print information produced in accordance with a page describing language on a serial printer and it is made possible to prevent occurrence of displacement of a character which relies upon an accuracy of a controlling section of a paper feeding mechanism by printing character data which can be printed in a single scanning stroke independently of graphic data, and that, as for character data, a high print quality can be maintained.

The above and further objects and novel features of the invention will more fully appear from the following detailed description when the same is read in connection with the accompanying drawings. It is to be understood, however, that the drawings are for purpose of illustration only and are not intended as a definition of the limits of the invention.

DETAILED DESCRIPTION OF THE PREFERRED EMBODIMENT

In the following, an embodiment of the present invention will be described with reference to the flow chart and other drawings.

Figure 1:
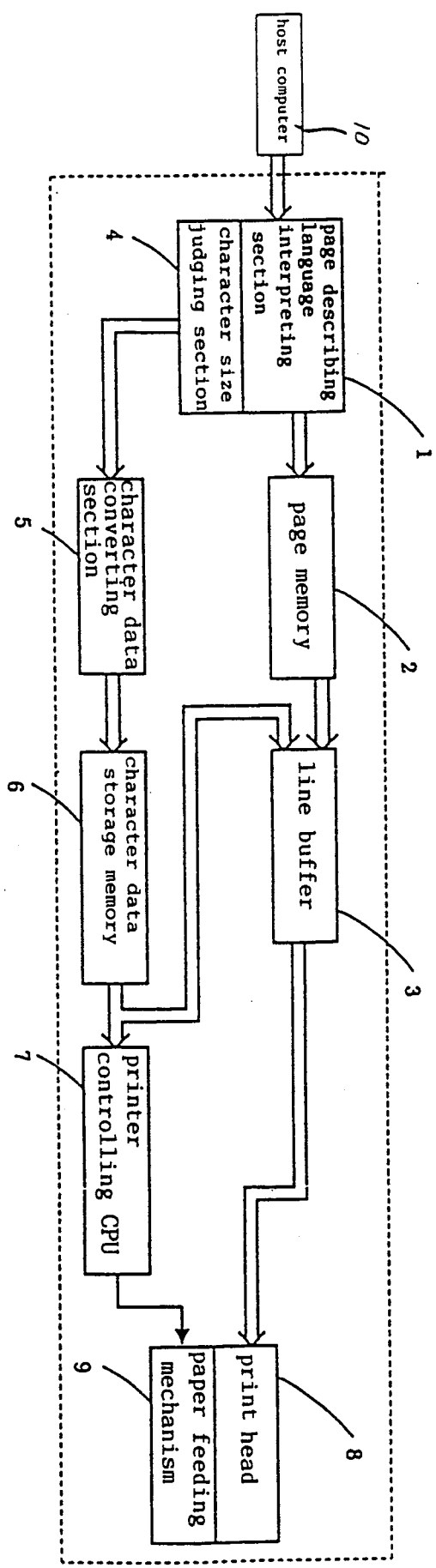
FIG. 1 is a block diagram of a serial printer according to an embodiment of the present invention.

FIG. 1 is a block diagram of a controlling system of a serial printer embodying the present invention. Reference numeral 1 denotes a page describing language interpreting section, and also first judging means for judging character data and image data is included in the page describing language interpreting section 1. Reference numeral 2 denotes a page memory, 3 a line buffer, 4 character size judging section for judging a character size, 5 a character data converting section, 6 a character data storage memory for storing character data therein, 7 a printer controlling CPU, 8 a print head, and 9 a paper feeding mechanism. The printer system sequentially executes a print information program received from a host computer 10 and produced in accordance with a page describing language to finally produce image data. The interpreting section 1 is realized by equivalent techniques to those of a conventional page printer. Meanwhile, the character size judging section 4 adds a function to the page describing language interpreting section 1.

Figure 2:
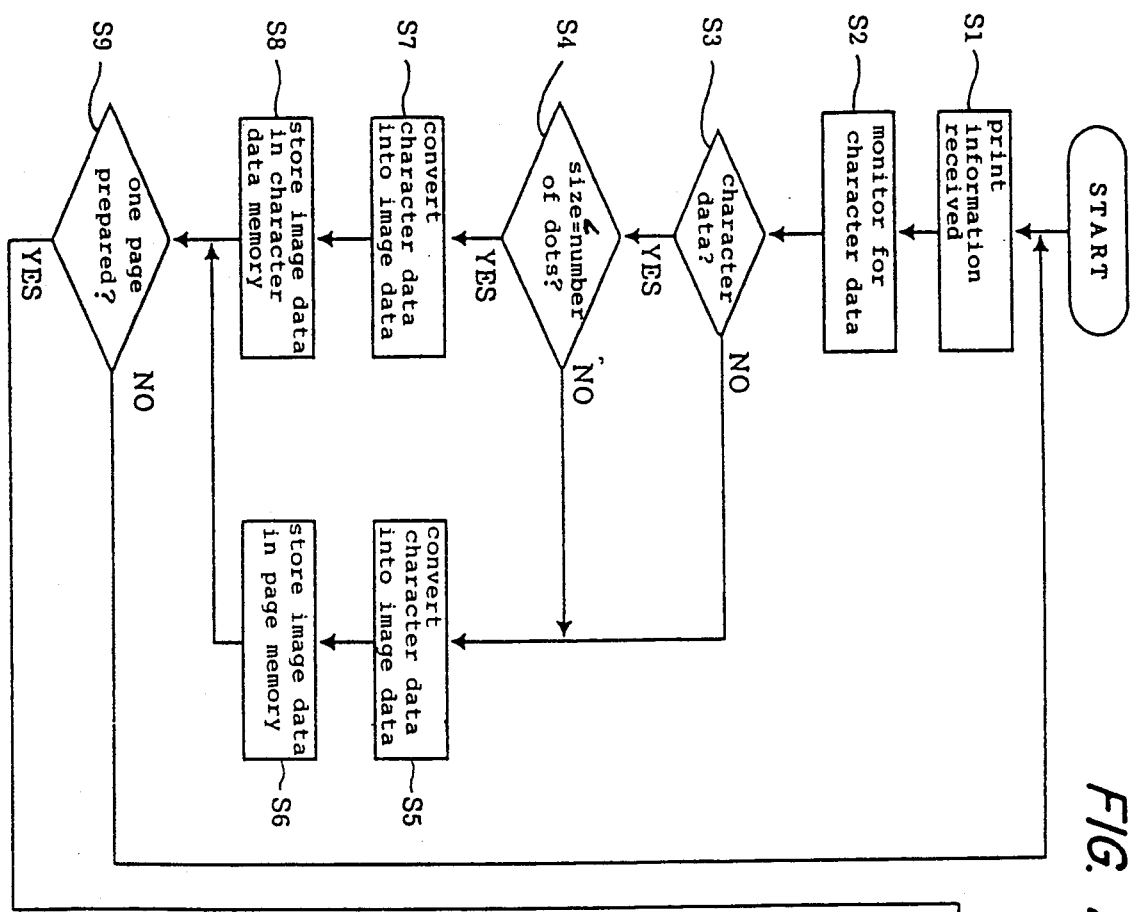
FIG. 2 is a flow chart illustrating a control flow of the serial printer of the embodiment.
Figure 2:
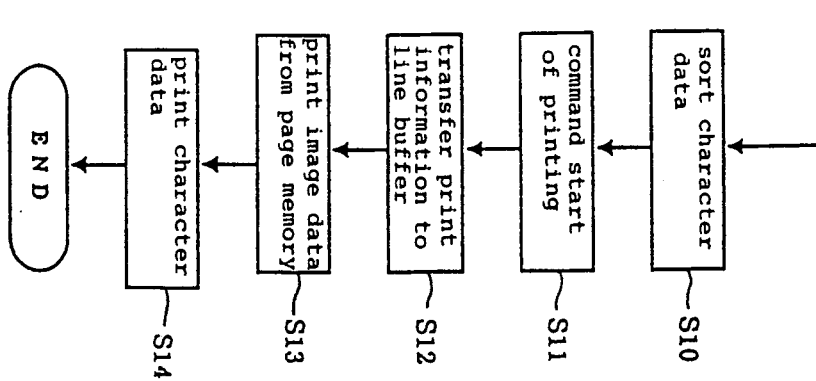
Figure 3:
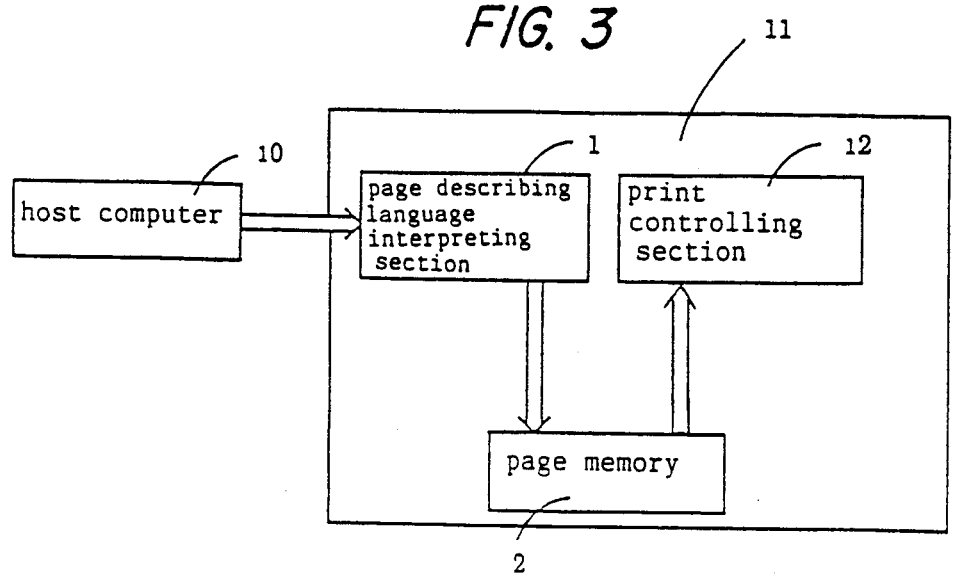
FIG. 3 is a block diagram of a conventional page printer.
Figure 4:
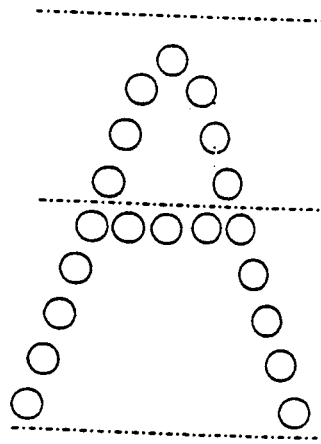
FIG. 4 is a detailed view illustrating a printing method of a conventional serial printer.

Operation of the serial printer having such a construction as described above will be described with reference to FIG. 2. First, a print information program from the host computer is received (S1), and then in the course of interpretation, presence or absence of character data is monitored by the character size judging section 4 (S2, S3). If character data are detected in (S3), then it is checked whether or not the size of the character data is greater than the maximum number of dots that the print head can print in a direction perpendicular to the feeding direction (S4). Here, character data of a large character (exceeding the maximum number of dots) are converted into image data similarly to graphic data, and the image data thus obtained by such conversion are stored into a predetermined address of the page memory 2 which is mapped with a bit map image with respect to an origin at a certain point on a print medium based on coordinate data as a parameter and also on a print medium size specified by a user (S5 and S6). Meanwhile, character data are searched by the character size judging section 4 from among the program data received from the host computer 10, and in case character data are detected which have a size smaller than or equal to the maximum number of dots that the print head can print in a direction perpendicular to the feeding direction of the head, that is, which can be printed in a single scanning stroke, they are converted into image data by the character data converting section 5 (S7), and then the image data and the coordinate information that the character information has are stored into the character data storage memory 6 (S8).

By repeating the processing described above, graphic data are stored into the page memory for one page while print information of character data are stored into the character data storage memory 6. Thus, after character information for one page is prepared (S9), the printer controlling CPU 7 receives a signal of completion of execution of the program for the print information conversion for one page from the page describing language interpreting section 1 and sorts the contents of the character data storage memory 6 (S10). This because it cannot be determined, until data for one full page are prepared, to which position of a print medium all of the character data for one page of character information detected by execution of a program in accordance with a page describing language are to be outputted since the page describing language itself is print information in the form of a program, and, generally, the printing positions of characters are stored at random in the character data storage memory 6. Thus, it is necessary to rearrange them into an order in which they are to be printed.

Further, at a point of time when image data for one page are prepared both in the page memory 2 and the character data storage memory 6, the page describing language interpreting section 1 delivers a command for the starting of printing to the printer controlling CPU 7 (S11), and print information is transferred from the page memory 2 to the line buffer 3 line by line in a synchronized relationship with a scanning speed of the printhead (S12), whereafter print information in the line buffer is sequentially read out and delivered to and printed by the print head 8 in a synchronized relationship with a scanning speed in the feeding direction of the print head (S13). After all of the image data in the page memory 2 are printed in this manner, the printer controlling CPU 7 transfers from the character data storage memory 6 to the line buffer 3 data stored therein after retrieval by the page describing language interpreting section 1 and sorting into the order to be printed. Data having the same coordinates with respect to a direction perpendicular to the direction of movement of the head, i.e., in the same print line, are grouped together. Then, the printer controlling CPU 7 converts coordinate data of the character data in a direction perpendicular to the direction of movement of the head into a feeding amount of the paper feed mechanism and outputs the feeding amount to the paper feeding mechanism 9 causing the paper feeding mechanism 9 to feed the print medium to a predetermined position, such that the position of the print head in the direction perpendicular to the direction of movement of the print head is determined. Whereafter, print information is read out from the line buffer 3 to print the character data (S14). In short, the present invention is embodied by storing graphic data and character data which can be printed in a single scanning stroke into different memories so that they may be printed at two different times.

Meanwhile, the present invention can be embodied also by a method and apparatus wherein graphic data and character data after conversion are stored into a common page memory and, when they are to be printed, the printing amount in a vertical direction in a line preceding a scanning line in which character data are present is adjusted in order to print the character data in a single scanning stroke and also the paper feeding mechanism is controlled so that the character data may be printed in a single scanning stroke.

Further, where both a draft mode and a near letter quality mode (detailed printing mode) are provided with regard to a printing mode of character information, a system may be adopted wherein the present invention is put into practice only in the near letter quality mode while the present invention is not put into practice in the draft mode and all of the oversized character information is treated as graphic data and printed accordingly.

While the invention has been particularly shown and described with reference to a preferred embodiment thereof, it will be understood by those skilled in the art that the foregoing and other changes in form and details can be made therein without departing from the spirit and scope of the invention. As a further example, the invention may be utilized in a line printer rather than a serial printer.

What is claimed is:

1. A serial printer comprising:
   a print means for printing one line of stored print data on a print medium for each scanning stroke of the print means;
   a feed means for feeding the print medium in a direction perpendicular to a moving direction of the print means;
   a first judging means for judging whether or not character data are in the print data;
   a second judging means for judging whether or not there exists in the character data judged by the first judging means character data with a character size which is printable in one scanning stroke of the print means; and
   a control means for controlling the print means so as to print the character data judged by the second judging means in one scanning stroke of the print means by adjustment of a printing amount of the character data by the print means and a feeding amount of the print medium by the feed means.

2. A serial printer according to claim 1, wherein the second judging means judges by comparing a maximum printable height of the print means in the direction perpendicular to the moving direction of the print means with the character size of the character data.

3. A serial printer according to claim 2, wherein the print means comprises a dot print head for printing characters by a plurality of dots.

4. A serial printer according to claim 3, wherein the second judging means judges by comparing a maximum number of dots printable in the direction perpendicular to the moving direction of the dot print head with a character size of the character data.

5. A serial printer according to claim 4, wherein the second judging means judges that the character data is printable by the dot print head in a single scanning stroke when the character size is equal to or smaller than said maximum number of dots of the dot print head.

6. A serial printer according to claim 1, wherein the control means further comprises a page memory and a character data memory and wherein the control means stores the character data judged printable in a single stroke by the second judging means in the character data memory and stores the character data judged nonprintable in a single stroke by the second judging means in the page memory.

7. A serial printer according to claim 6, wherein the print data includes the character data and graphic data.

8. A serial printer according to claim 7, wherein the graphic data is stored in the page memory.

9. A serial printer according to claim 8, wherein the control means controls the print means to commence printing of the print data after confirming that the print data for one page is stored in the page memory and the character data memory.

10. A serial printer according to claim 1, wherein the control means controls the print means to print the character data in the character data memory for one page after printing of the data in the page memory for said one page.

11. A serial printer according to claim 1, wherein the control means adjusts the feeding amount of the print medium based upon coordinate data of the character data in the direction perpendicular to the moving direction of the print means stored in the character data memory.

12. A serial printer comprising:
   printing means for interpreting print information produced in accordance with a page describing language, converting the print information into image data and printing the image data;
   first judging means for judging character data and graphic data from the image data; and
   second judging means for judging whether or not the character data have such a size that they can be printed in a single scanning stroke, wherein, when character data which can be printed in a single scanning stroke are present in the print information, the paper feeding amount by a paper feeding mechanism and a printing amount by the printing means are adjusted so that the character data may be printed in a single scanning stroke.

13. A printer comprising:
   a print means for printing one line of stored print data at a time on a print medium;
   means for providing relative movement between said print medium and said print means in at least a direction perpendicular to a direction of a printed line printed by the print means;
   a judging means for judging whether or not character data is included in the print data and identifying any such data which has a character size which is printable in a single print line without said relative movement in said perpendicular direction; and
   a control means for controlling the print means so as to print in a single print line the character data identified by the judging means, without said relative movement in said perpendicular direction, by adjustment of the movement amount in said perpendicular direction of said means for providing relative movement.

14. A printer according to claim 13, wherein said means for providing relative movement comprises a feed means for feeding the print medium.

15. A printer according to claim 13, wherein said printer is a serial printer and said means for providing relative movement comprises means for moving the printhead in the scanning direction of the print means.

16. A printer according to claim 13, wherein a printing amount of the character data by the printing means is also adjusted to print in a single print line the character data identified by the judging means.

17. A serial printer comprising:
- a print means for printing one line of stored print data on a print medium for each scanning stroke of the print means;
- a feed means for feeding the print medium in a direction perpendicular to a moving direction of the print means;
- a first judging means for judging whether or not character data are in the print data;
- a second judging means for judging whether or not there exists in the character data judged by the first judging means character data with a character size which is printable in one scanning stroke of the print means; and
- a control means for controlling the print means so as to print the character data judged by the second judging means in one scanning stroke of the print means by adjustment of a feeding amount of the print medium by the feed means.

18. A printer comprising:
- printing means for interpreting print information produced in accordance with a page describing language, converting the print information into image data and printing the image data; and
- judging means for judging character data and graphic data from the image data, wherein
- at least a portion of said character data for a given page is printed after all of said graphic data for the given page has been printed, dpending upon the size of said character data.

* * * * *